United States Patent [19]

Rousset et al.

[11] Patent Number: 5,338,714
[45] Date of Patent: Aug. 16, 1994

[54] COMPOSITE ALUMINA/METAL POWDERS, CERMETS MADE FROM SAID POWDERS, AND PROCESSES OF PRODUCTION

[75] Inventors: Abel Rousset, Ramonville; Xavier DeVaux, Lanouaille, both of France

[73] Assignee: Centre National de la Recherche Scientifique (C.N.R.S.), Paris, France

[21] Appl. No.: 856,153

[22] PCT Filed: Jul. 22, 1991

[86] PCT No.: PCT/FR91/00606

§ 371 Date: Mar. 24, 1992

§ 102(e) Date: Mar. 24, 1992

[87] PCT Pub. No.: WO92/01645

PCT Pub. Date: Feb. 6, 1992

[30] Foreign Application Priority Data

Jul. 24, 1990 [FR] France .................. 90 09790

[51] Int. Cl.$^5$ ............................. C04B 35/16
[52] U.S. Cl. ...................... 501/127; 75/343; 75/362; 75/363; 75/956; 419/1; 419/10; 419/19; 419/22; 501/153
[58] Field of Search .......... 501/127, 153; 75/228, 75/230, 232, 245, 246, 343, 956, 362, 363; 419/1, 10, 22, 23, 53, 54, 19; 428/546, 539.5; 423/600, 629

[56] References Cited

U.S. PATENT DOCUMENTS

| | | |
|---|---|---|
| 3,876,557 | 4/1975 | Bland .................. 502/328 |
| 4,689,077 | 8/1987 | Chevigne et al. .......... 75/233 |
| 4,719,074 | 1/1988 | Tsuno et al. ............. 419/5 |
| 4,743,511 | 5/1988 | Sowman et al . .......... 419/10 |
| 4,756,754 | 7/1988 | Singhdeo ................ 75/233 |
| 4,847,044 | 7/1989 | Ghosh ................... 419/8 |
| 4,961,902 | 10/1990 | Clere et al. ............ 419/12 |
| 5,041,261 | 8/1991 | Buljan et al. ........... 419/11 |
| 5,149,361 | 9/1992 | Iyori et al. ............ 75/233 |

FOREIGN PATENT DOCUMENTS 28885 5/1981 European Pat. Off. .
2327180 12/1973 Fed. Rep. of Germany .

OTHER PUBLICATIONS

Proceedings of the 21st Automotive corrdination meetings. Mar. 1984, Warrendale, Pa.
Morgan et al., "Thermal-Shock Resistant Alumina-Metal Cermet Insulators", American Ceramic Society Bulliten vol. 61, No. 9, Sep. 1982.
Guille et al., "Cosintering of Alumina with Cobalt or Chromium doped with Tungsten at 1400° C.," Jour. Mat Sc., vol. 24, No. 1, 1989.
Yamada et al., "Manufacture of Alumina Via Aluminum Oxalate Complex," Ch. Abstracts, vol. 108, No. 12, 1988, Abs. No. 9178813.
Covino, "Sol-gel process for the incorporation of transition metals within ceramic oxide matrices and the preparation of gamma-alumina and lithium alumina silicate-like ceramics incorporating desired metal oxides"; Ch. Abstracts, vol. 111, No. 6, 1989 Abstract No. 101883f.

*Primary Examiner*—Mark L. Bell
*Assistant Examiner*—Michael Marcheschi
*Attorney, Agent, or Firm*—Harold H. Dutton, Jr.

[57] ABSTRACT

The invention relates to nano-composite powders of alumina and metal constituted of grains of micronic size. Each grain comprises a compact matrix of alumina of a specific surface area less than 5 m$^2$/g, in which are dispersed crystallites of transition metals of alloys of these metals, of sizes less than 50 nm. The powder according to the invention may be produced starting with a precursor comprised of a mixed carboxylic salt of aluminum and one or more transition metals. The powders according to the invention permit producing by sintering cermets of alumina/metal benefitting from greatly improved mechanical and thermo-mechanical properties.

15 Claims, 10 Drawing Sheets

COMPOSITE ALUMINA/METAL POWDERS, CERMETS MADE FROM SAID POWDERS, AND PROCESSES OF PRODUCTION

This invention relates to composite powders of ceramic/metal of the type comprising a matrix of alumina and at least one transition metal, in particular iron, chromium, molybdenum, cobalt, nickel or niobium, which is present in the form of a dispersion of fine particles on the interior of each grain of the matrix. The invention also relates to powders called "nano-composites" in which the metal particles are on the scale of a nanometer. The invention also relates to cermets obtained by sintering said powders and to processes for production of these powders and cermets.

BACKGROUND AND OBJECTS OF THE INVENTION

Composite alumina/metal powders are used for producing catalysts, or for fabrication by sintering cermets. The latter have numerous applications in various sectors of industry by reason of their thermo-mechanical and dielectric properties (by the term "cermet" is customarily meant a composite material mass of ceramic/metal).

Composite alumina/metal powders presently known are essentially of two types:

microcrystalline powders of high porosity for production of catalyst supports (J. J. Chen, E. Ruckenstein, Journal of Catalysts 69, (1981), 254–273; A. Uneo, H. Suzuki, Y. Kotera, Journal of the Chemical Society, Faraday Transaction 79, (1983), 127–136), amorphous gels (L. Ganapathi et al, Journ. Solid State Ch., vol. 66, 1987, pages 376–378; J. T. Klomp et al, Ceramurgia int., vol. 4, 1978 pages 59–65; D Chakravorty, Sadhana, vol. 13, 1988, pages 13–18 . . . ).

These powders are comprised of matrices of $\gamma$ or amorphous alumina and a metallic dispersion. Their main drawback is in being thermally unstable such that they do not permit production by sintering of cermets having good mechanical properties. During sintering, the metal particles have, in effect, a tendency to coalesce and to migrate toward their grain junctions leading to a heterogeneous dispersion in which the metal phase is found in the form of particles of large size juxtaposed with grains of ceramic, with appearance of porosities between these phases. This microstructure leads to poor properties in a mechanical sense, and a thermal instability arising from differences of the coefficients of expansion of the phases (which causes a rupturing of the structure during heat treatment).

Certain prior art documents have suggested the possibility of mixing $\alpha$ alumina with a metal binder (patent DD 137,313; U.S. Pat. No. 4,397,963, "Proceeding of the 21st automotive technology coordination meeting, " March 1984 Society of Automotive Engineers Inc., Warrendale, Pa., USA; American Ceramic Society Bulletin, vol. 61, no. 9, September, 1982, Columbus US pages 974–981, C. S. Morgan, et al: Thermal-Shock Resistant Alumina-metal Cermet Insulators"). However, in the powders thus obtained, the metal is arranged on the periphery of the grains: these powders have a microstructure which is fundamentally different from that provided by the present invention, since the metal is not inserted on the interior of each grain of the matrix. The sintering of these powders leads to microstructures of cermets similar to those indicated above with inherent drawbacks.

The present invention proposes providing new alumina/metal composite powders in which the metal is present in the form of a dispersion on the interior of each grain of the matrix, and their process of production. The invention seeks to overcome the drawbacks of known powders and permits the production of cermets benefitting from greatly improved mechanical properties and a good thermo-mechanical relationship.

In particular, the invention seeks to permit the production of alumina/metal cermets which are apt to sustain thermal shocks.

Another object of the invention is to permit production of powders from several metals, in which the metal dispersion is in the form of an alloy in order to benefit from the properties of the latter.

DESCRIPTION OF THE INVENTION

To this end, the composite ceramic/metal powder provided by the invention, which may be obtained by the process defined below, is constituted by micron-size grains comprising alumina and at least one transition metal, and is characterized in that:

each grain comprises a compact matrix, of a specific surface area less than 5 $m^2/g$, said matrix is comprised of $\alpha$ alumina (corundum) of hexagonal structure, the transition metal or metals are dispersed in each grain at the center of the alumina matrix in the form of small crystals of sizes less than 50 nanometers (designated below as "nano-crystals"), the weight ratio of metal/alumina is less than 30%.

The microstructure of such a powder is fundamentally different from that heretofore produced with $\alpha$ alumina, since the metal or metals are present in the form of very fine particles dispersed on the interior of each grain of alumina (and not a metal coating arranged around each grain of alumina or of particles arranged between the grains of alumina). The powder according to the invention is freed of problems of wettability of the alumina by the transition metals (problems which in known powders are the source of the phenomena of coalescence and segregation of the metals during heat treatments) due to a homogeneous dispersion of metal nanocrystals in the non-porous micronic matrices of $\alpha$ alumina (this phase being thermally stable).

The composite powder conforming to the invention permits producing cermets comprising a ceramic matrix of $\alpha$ alumina in which are dispersed, in an intragranular manner, metal particles of sizes less than 100 nanometers.

These cermets are obtained by sintering the powders, in particular under the following conditions:

a minor addition to the powder of an organic binder having a decomposition temperature of between 150° C. and 300° C., decomposition being accompanied by a release of CO, compacting of the powder/binder mixture, heating of the compacted mixture, under a neutral atmosphere or reduced pressure, at a temperature of between 1350° C. and 1550° C.

Observations of the cermets thus obtained, carried out with an electron microscope and by X-ray diffraction, permit establishing very low coalescence of metal crystals of which the size increases slightly during the sintering, but which remain captive by ceramic matrices in the form of small intragranular particles, with a slight percentage of intergranular particles of which the size remains low (less than 100 nanometers.) Such cermets have a compact structure with a rate of densification greater than 98%, which leads to excellent mechanical properties, in particular:

a resistance to bending comprising between 500 and 1000 megapascals, a resilience comprising between 5 and 10 megapascals per $\sqrt{m}$.

Moreover, tests have shown that these cermets subjected to heat treating/tempering cycles (heating to 600° C. followed by tempering in water) do not cause any damage, even at 30 cycles, while known cermets burst at the end of about ten cycles, and alumina alone withstands only a few cycles. These exceptional properties of thermal stability come from the structure itself of the cermet obtained, in which the α alumina is reinforced by the very fine intragranular dispersion. In effect, the plastic deformation of the metal phase permits absorbing all or part of the differential elastic deformations induced by thermal shock. In other words, the tenacity of such cermets is higher than that of pure alumina, a part of the energy of propagation of cracks being absorbed by metal particles.

The ceramic/metal composite powder according to the invention, may in particular be produced by the process defined hereafter, which comprises:

(a) preparing an aqueous solution of a mixed carboxylic salt of aluminum and one or several transition metals, of the formula $Al_{1-x} M_x (R)_n$ where M represents the transition metal(s), R is a carboxylic radical, x is less than 0.3 and n is a whole number, (b) precipitating this mixed salt by an organic solvent miscible with water, in which said salt is stable and insoluble, (c) separating the precipitate obtained from the liquid phase and recovering the precipitate in the form of a micronic powder of mixed salt, called a precursor, (d) subjecting said precursor to a heat decomposition treatment in the presence of oxygen at a temperature between 300° C. and 500° C. under conditions appropriate for decomposing the precursor and producing a mixed amorphous oxide of aluminum and the transition metal(s) $[Al_2O_3]_{(1-x)}M_{2x}O_y$ where y is a whole number which is a function of the valence of the transition metals, (e) in the case of metals or alloys having a fusion point lower than 1600° C., subjecting the mixed oxide to a thermal treatment by reheating in the presence of oxygen to a temperature between 1000° C. and 1300° C. in order to obtain a crystallized solid solution of aluminum and an oxide of the transition metal or metals, (f) reducing either the amorphous mixed oxide from step (d), or in the in the case of metals or alloys of low fusion point, the solid crystalline solution from step (e), by a heat treatment in a reducing atmosphere free of water vapor at a temperature of between 1000° C. and 1300° C. for a period greater than 2 hours.

Obtaining the aforementioned characteristics of the powder (nanocrystalline metals dispersed in micronic matrices; compact nature of these matrices; the type of alumina obtained) is essentially achieved by:

the use of a mixed precursor,
the precipitation conditions thereof,
the decomposition conditions of the precursor,
the heat treatment conditions of the decomposition residues.

The powders obtained by carrying out the above defined process have been analyzed by X-ray diffraction and have been observed by electron microscopy. In most of these cases, the transition metal or metals are dispersed in the aluminum matrix of each grain with a distribution of sizes such that 90% in number of the metal particles have sizes arranged over an interval less than 8 nanometers, and most often between 1 and 7 nanometers.

The process of the invention permits in particular producing composite powders comprised of grains having an aluminum matrix and at least one metal of the following group: iron, chromium, molybdenum, cobalt, nickel, and niobium. It is sufficient to prepare the aqueous solution of the mixed carboxylic salt (a) from at least one salt of the corresponding metal.

The process of the invention permits also the production of composite powders constituted of grains comprising an alumina matrix and at least two transition metals, dispersed in the matrix in the form of a metal alloy. The alloyed form of the metals of crystallites has been established by X-rays, electron microscopy and by X energy dispersion. It is sufficient for producing such powders, to prepare the aqueous solution of mixed carboxylic salt (a) starting from at least two salts of metals able to form an alloy, particularly iron/chromium, nickel/cobalt, nickel/chromium.

According to a preferred embodiment, (a) the solution of mixed salt is prepared by mixing in an aqueous medium, oxalic acid or a salt of oxalic acid a salt of aluminum, and at least one salt of a transition metal, in order to produce the mixed carboxylic salt by a complexing reaction between the oxalic radicals, the metal aluminum ions and the ions of the transition metal or metals. In particular, one can choose between ammonium oxalate, chloride or nitrate of aluminum and the chloride or nitrate of the transition metal or metals, in order to form the following mixed carboxylic salt:

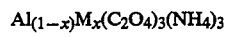

$Al_{(1-x)}M_x(C_2O_4)_3(NH_4)_3$

To further improve the purity and morphology of the powders obtained (regularity of the shape and size of the matrices), the process according to the invention may be carried out under the following conditions:

(a) an aqueous solution of a mixed carboxylic salt having a concentration between 0.1 and 3 moles/l is prepared, (b) the mixed carboxylic salt is caused to precipitate while adding the aqueous solution into a alcohol solvent or a mixture of an alcoholic solvent and another organic solvent, or a mixture of alcoholic solvents, in particular a mixture of ethanol/ethylene glycol or methanol/ethylene glycol, the aqueous solution of the mixed carboxylic solvent is poured into the solvent in such a manner that the volumetric ratio between said aqueous solution and said solvent comprises between 5 and 20, the medium being agitated for a period of time at least equal to 30 minutes at a temperature of at most 30° C., (c) the precipitate is separated by filtration or centrifugation, and is washed with acetone or ethanol, and is dried at a temperature below 80° C., (d) the decomposition treatment is carried out while slowly heating the powder in a flow of air, with a speed of temperature rise at most equal to 2° C. per minute, to a floor temperature preferably of between 370° C. and 450° C., and maintaining the powder at this floor temperature for at least one hour.

In the case of metals or alloys having a low melting point (less than 1600° C.), the reheating treatment which follows reduces the porosity of the mixed alumina oxides and, as a result, limits the coalescing phenomena during the step following the reduction (the metal atoms have, in effect in this case, a very high tendency to diffusion by reason of the low difference between the reduction temperature and the melting point: the compactness accruing from the alumina matrices limits this tendency.)

For the following metals or alloys (with low melting points): iron, cobalt, nickel, iron/chromium, cobalt-/nickel, nickel/chrome, (e) this reheating treatment of the mixed oxide is preferably achieved during a period at least equal to 30 minutes, (f) the reduction of the solid crystallized solution being then carried out under an atmosphere of dry hydrogen for a period of time between 2 and 20 hours.

In the case of high melting point transition metals such as chromium and niobium, (f) the reduction of the mixed amorphous oxide from step (d) is directly acted upon under a dry hydrogen atmosphere for a period of between 10 and 20 hours. This period of time permits a good crystallization of $\alpha$ alumina and eliminates all porosity.

In the case of molybdenum, (f) the reduction of the mixed amorphous oxide from step (d) is directly carried out in an atmosphere of dry hydrogen while heating the oxide initially to a floor temperature between 400 and 500° C. for a period of time between 1 and 5 hours, then to a final temperature between 1000° and 1200° C. for a period of between 5 and 20 hours. This reduction in two successive stages avoids all risk of sublimation of the molybdenum oxides when one reaches the temperature of 800° C.

DESCRIPTION OF THE DRAWINGS

The invention described above in its general form, is illustrated by Examples 1 to 10 which follow, with reference to the accompanying drawings. In these drawings.

DETAILED DESCRIPTION OF THE PREFERRED EMBODIMENTS

Example 1

Preparation of a composite alumina/iron powder containing 5.4% by weight of iron.

a) A solution A is prepared from:
53.46 g of aluminum nitrate ($Al(NO_3)_3.9H_2O$),
3.03 g of iron nitrate ($Fe(NO_3)_3.9H_2O$),
63.95 g of ammonium oxalate (($NH_4)_2C_2O_4.H_2O$),
150 cm$^3$ of distilled water.

Solution A is agitated for 40 minutes in order that the following complexing reaction is completed:

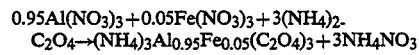

$$0.95Al(NO_3)_3 + 0.05Fe(NO_3)_3 + 3(NH_4)_2C_2O_4 \rightarrow (NH_4)_3Al_{0.95}Fe_{0.05}(C_2O_4)_3 + 3NH_4NO_3$$

Figure 1:
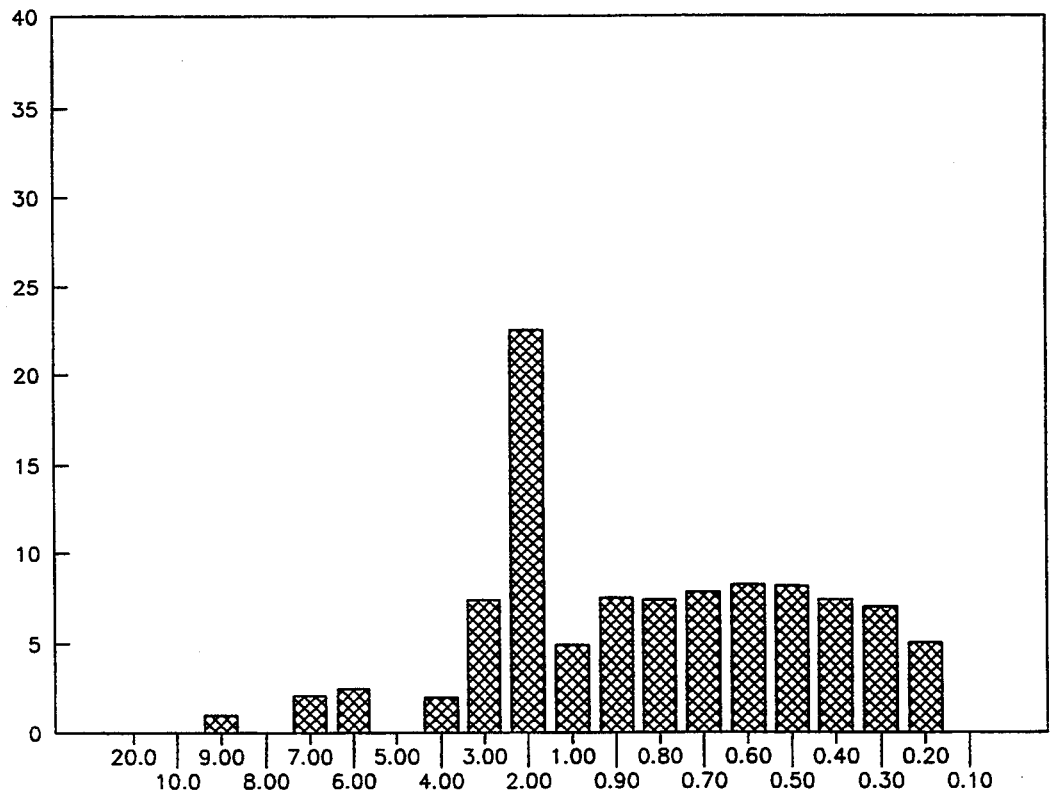
FIGS. 1, 3, 5, 7 and 8 are diagrams of the size distribution of the composite powders obtained respectively in examples 1, 3, 5, 7 and 8; on the abscissa is arranged a logarithmic scale of the average diameter of each granulometric class (in microns), and on the ordinate the volumetric percentage of these grains.
Figure 2:
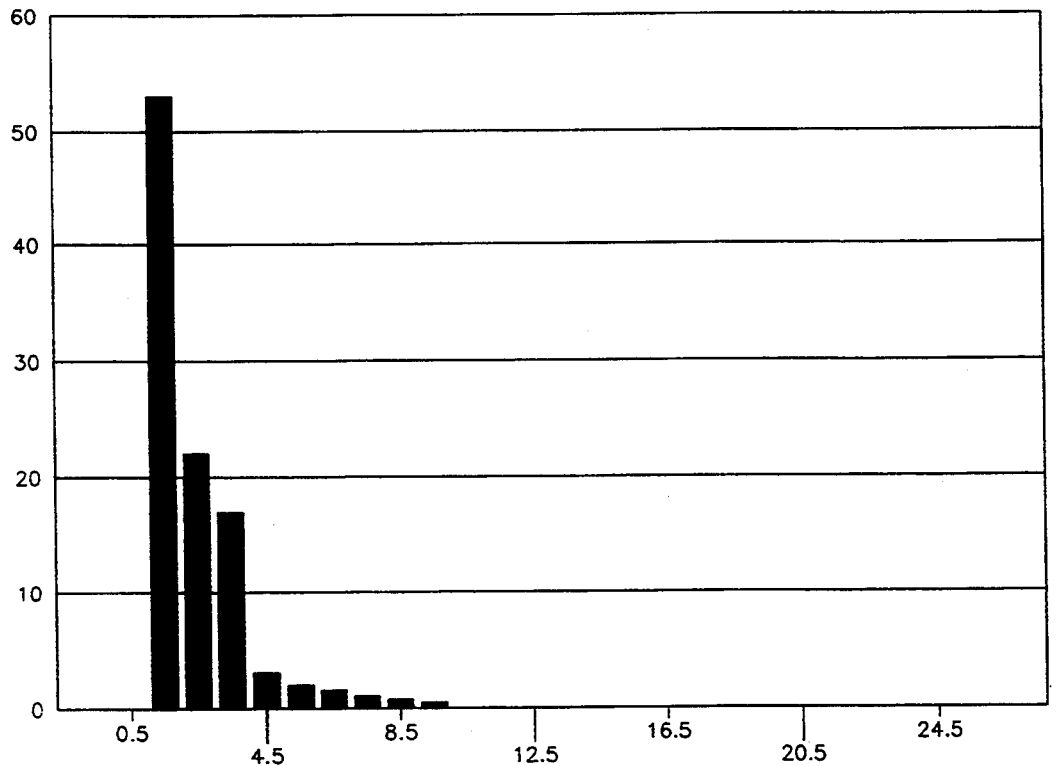
FIGS. 2, 4, 6 and 9 are graphs of the distribution of sizes of metal particles dispersed in the composite powders obtained respectively in examples 1, 3, 5 and 8. On the abscissa is shown the size of the metal particles in nanometers and on the ordinate their percentage by number (from a count of 1000 individual grains measured from micrographs obtained from the electron transmission microscope)
Figure 10:
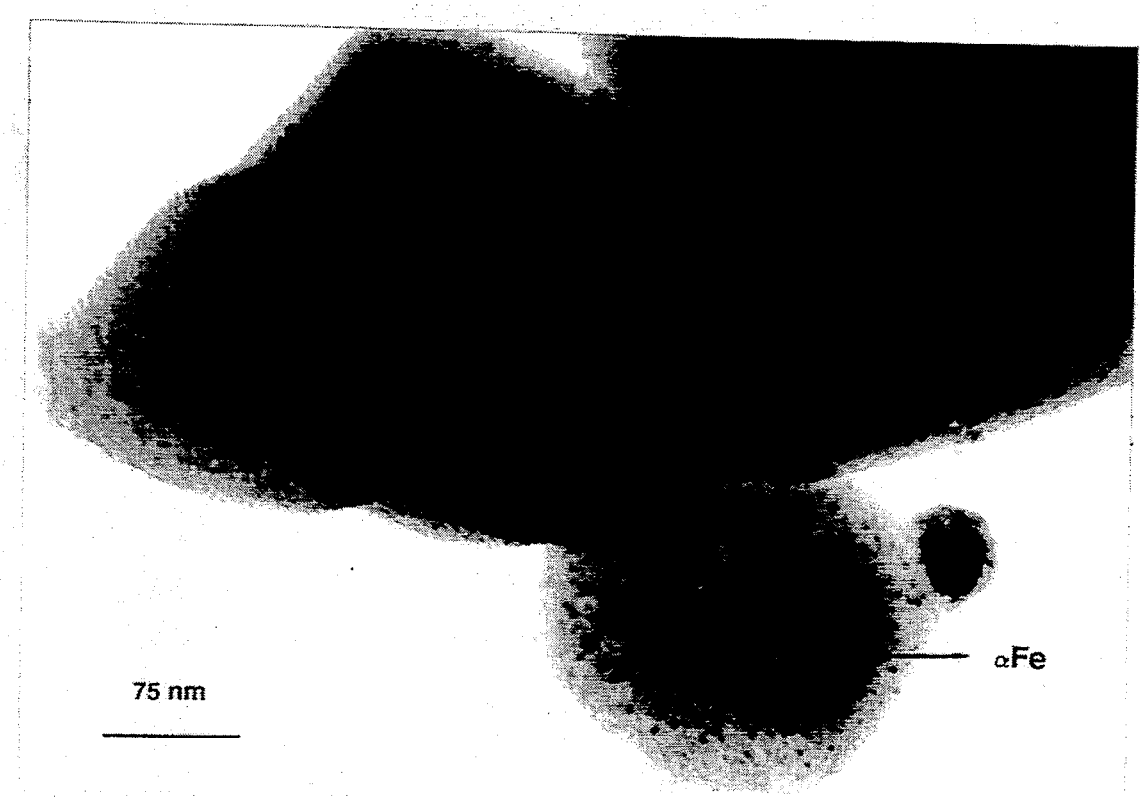
FIGS. 10, 12, 14, 16 and 17 are micrographs of composite powders obtained respectively in examples 1, 3, 5, 7 and 8.

The molar concentration of oxalate of this solution is 0.75 mole/l.

b) A solution B containing 750 cm$^3$ of ethanol and 750 cm$^3$ of ethylene glycol is prepared with agitation. Solution A is added into solution B with agitation. The volumetric ratio between solution A and solution B is equal to 7.5. The mixed oxalate $(NH_4)_3Al_{0.95}Fe_{0.05}(C_2O_4)_3$ precipitates after several minutes The agitation is maintained for 1 hour at ambient temperature (20° C.).

c) The precipitate is filtered, then washed with ethanol. It is then dried in the stove (70° C.), then disagglomerated by grinding and screened. It is analyzed by chemical analysis and thermogravimetry, and is comprised of the mixed oxalate $(NH_4)_3Al_{0.95}Fe_{0.05}(C_2O_4)_3$.

d) The precursor thus obtained is decomposed in air in a furnace at 400° C., the speed of heating being 2° C./mn, the time of heating being one hour.

e) The decomposition residue is then brought to 1150° C. for 2 hours at a heating speed of 5° C./mn. Radiocrystallographic analysis revealed that at this step, a solid solution of alumina and hematite is obtained. The chemical dosage enables us to conclude the presence of the phase $\alpha$ $Fe_{0.1}Al_{1.9}O_3$.

f) The mixed oxide is reduced under dry hydrogen at a temperature of 1050° C. for 3 hours. Radiocrystallographic analyses showed that the powder obtained is composed of $\alpha$ alumina (hexagonal structure) and metallic iron. Granulometric analyses (FIG. 1) indicates that the average size of the grains of alumina is 1.5 $\mu$m. The specific surface area of the composite powder, measured by the B.E.T. method, is 1.95 m$^2$/g. Study of the dispersion of the metallic particles is carried out by electron microscope in transmission. A system of analysis by X energy dispersion (EDAX) is connected to the microscope and permits making a chemical analysis of zones of 10 nm per beam. Microscopic studies show that the metallic particles appear with a dark contrast (FIG. 10). The distribution graph of the iron particle sizes shows that the average size of the metallic particles is 2.6 nm (FIG. 2). 90% of the metallic particles have sizes between 1 and 5 nanometers.

Example 2

Preparation of a cermet from the composite powder obtained in Example 1.

Figure 11:
FIGS. 11, 13, 15 and 18 are micrographs of cermets obtained respectively in examples 2, 4, 6 and 9 (it should be noted that to facilitate observation, the cermets corresponding to the micrographs 13, 15 and 18 have been metallized with gold).

3 g of the alumina/iron powder obtained from the preceding Example 1 were mixed with 0.5 g of polyvinylic acid. This mixture is pressed under a pressure of 43 MPa, under a vacuum, at a temperature of 1450° C. for 15 minutes. The extent of densification of the cermet obtained was 99%. The microstructure of this cermet is studied by electron transmission microscopy (FIG. 11). These microstructural characteristics and the mechanical properties of the cermet are summarized in the summary table provided at the end of the description.

Example 3

Preparation of a composite alumina-iron powder containing 10.8% by weight of iron.

a) A solution C is prepared starting with:
50.64 g of aluminum nitrate ($Al(NO_3)_3.9H_2O$),
6.06 g of iron nitrate ($Fe(NO_3)_3.9H_2O$),
63.95 g of ammonium oxalate (($NH_4)_2C_2O_4.H_2O$),
150 cm³ of distilled water.

Figure 3:
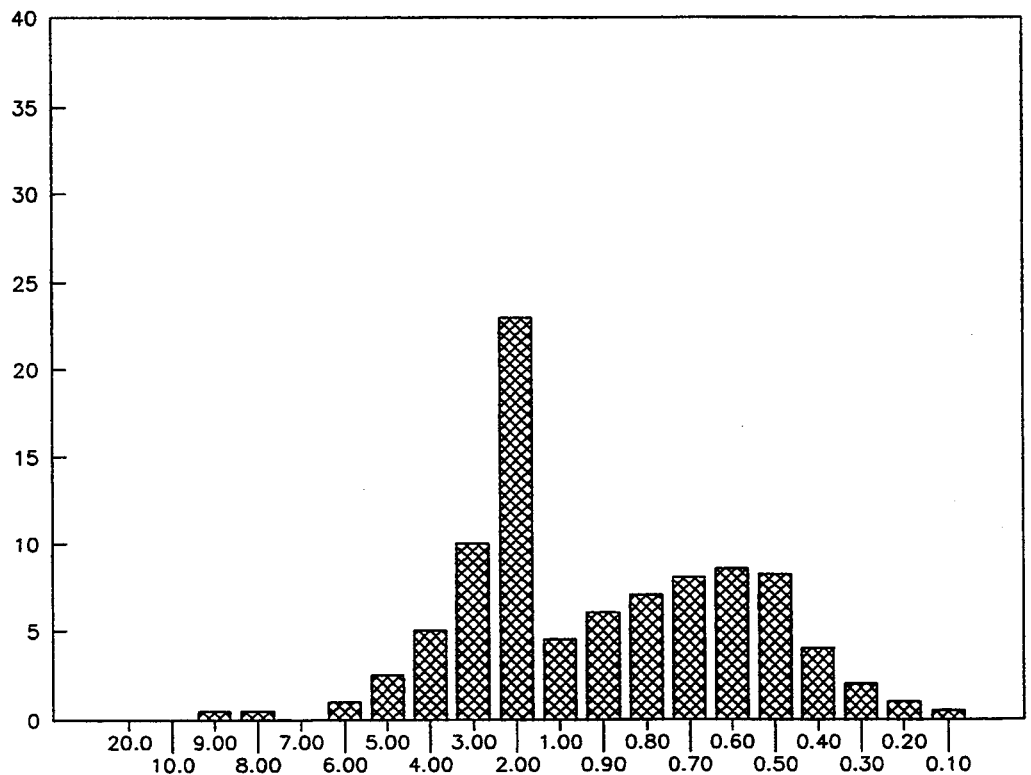
Figure 4:
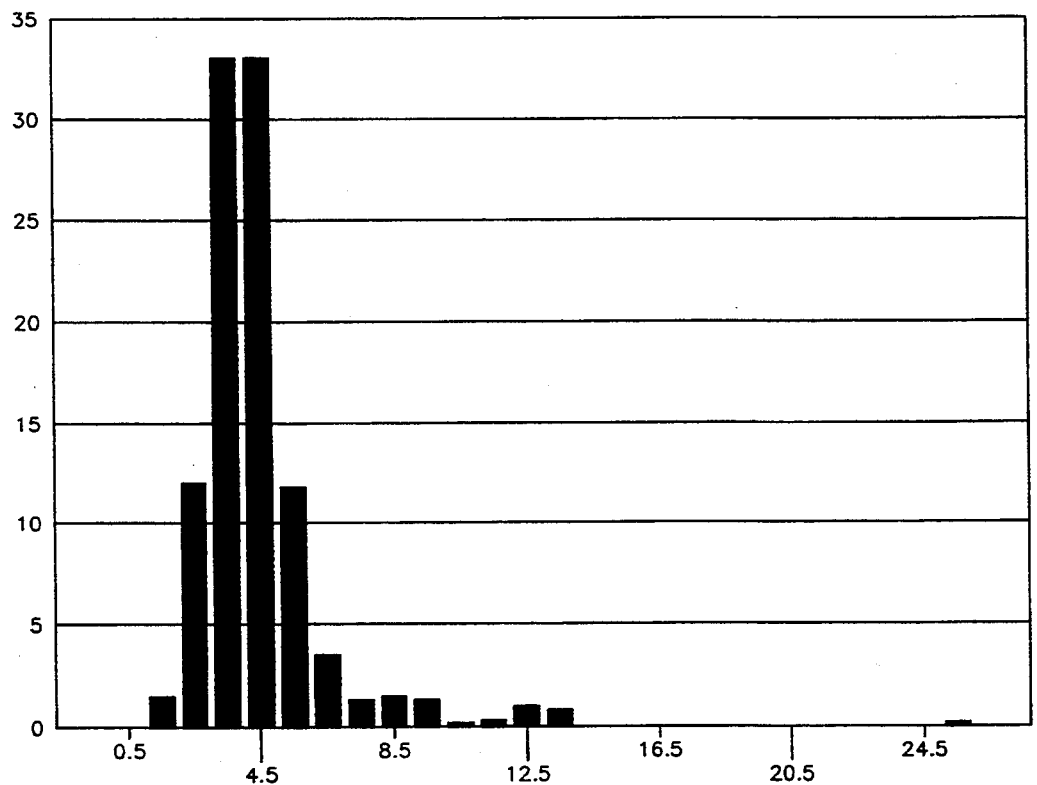
Figure 12:
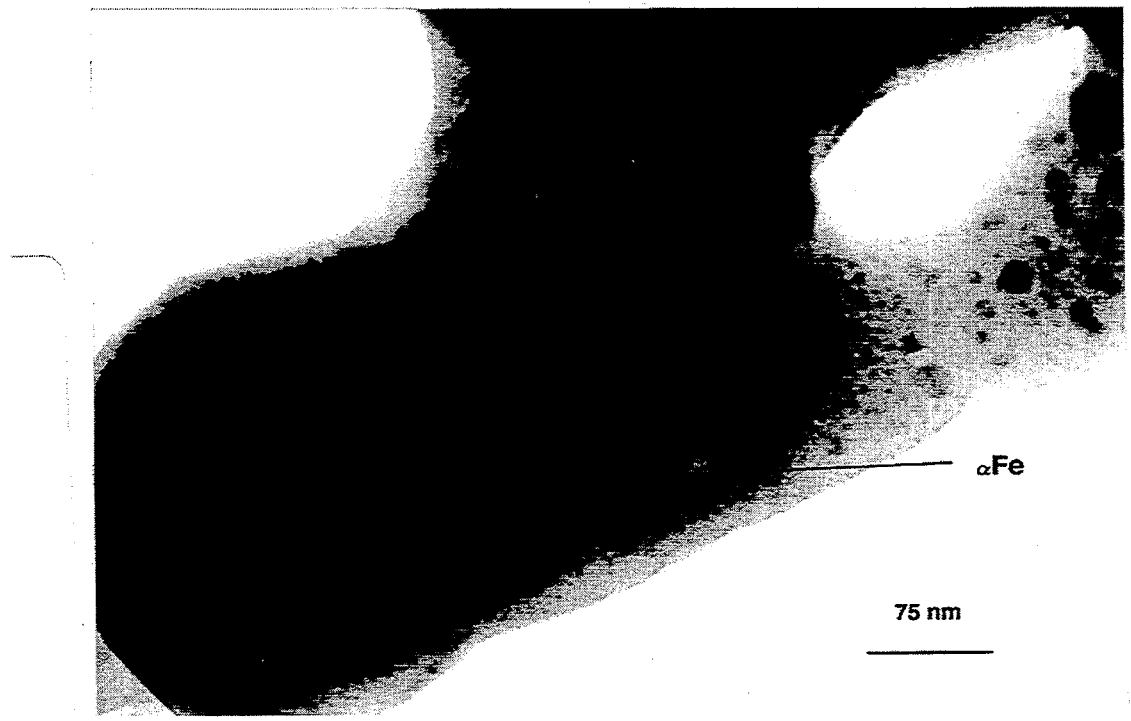

The solution C is agitated for 40 minutes in order that the following complexing reaction is complete:

$0.9\ Al(NO_3)_3 + 0.1\ Fe(NO_3)_3 + 3\ (NH_4)_2C_2O_4 \rightarrow (NH_4)_3Al_{0.9}Fe_{0.1}(C_2O_4)_3 + 3NH_4NO_3$ The molar concentration of the oxalate in this solution is 0.75 mole/l.

b) A solution D containing 1497 cm³ of ethanol and 3 cm³ of ammonia is prepared with agitation. The solution C is added into the solution D with agitation. The mixed oxalate $(NH_4)_3Al_{0.9}Fe_{0.1}(C_2O_4)_3$ precipitates after several minutes. The agitation is continued for 1 hour at ambient temperature (20° C.).

c-f) The conditions of filtration, drying, decomposition of the oxalic precursor, heat treatments for reheating and reducing are similar to those described in Example 1. The same analyses are carried out on the composite powder. The results are as follows:
specific surface area: 1.5 m²/g,
average size of the grains of powder (FIG. 3): 1.45 μm,
average size of iron particles: 4.5 nm (graph of FIG. 4 and micrograph of FIG. 12),
90% of the metallic particles have sizes between 2 and 7 nanometers.

Example 4

Preparation of a cermet starting with the powder obtained in Example 3.

Figure 13:
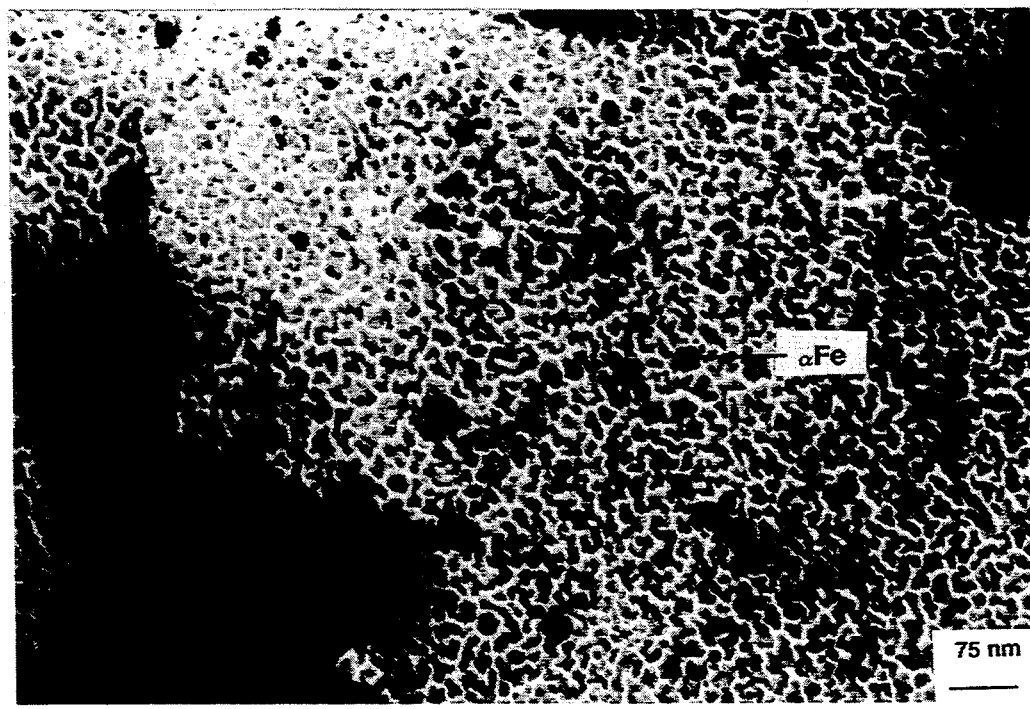

The composite powder is densified under the conditions described in Example 2. The extent of densification is 99%. The microstructure of the cermet thus obtained is presented in the micrograph of FIG. 13. The microstructural characteristics and the mechanical properties of the cermet are summarized in the summary table at the end of the description.

Example 5

Preparation of a composite aluminum iron/chromium alloy containing 10.8% by weight of alloy.

a) A solution E is prepared starting with:
50.64 g of aluminum nitrate ($Al(NO_3)_3.9H_2O$),
4.85 g of iron nitrate ($Fe(NO_3)_3.9H_2O$),
1.20 g of chromium nitrate ($Cr(NO_3)_3.9H_2O$),
63.95 g of ammonium oxalate (($NH_4)_2C_2O_4.H_2O$),
150 cm³ of distilled water.

Figure 5:
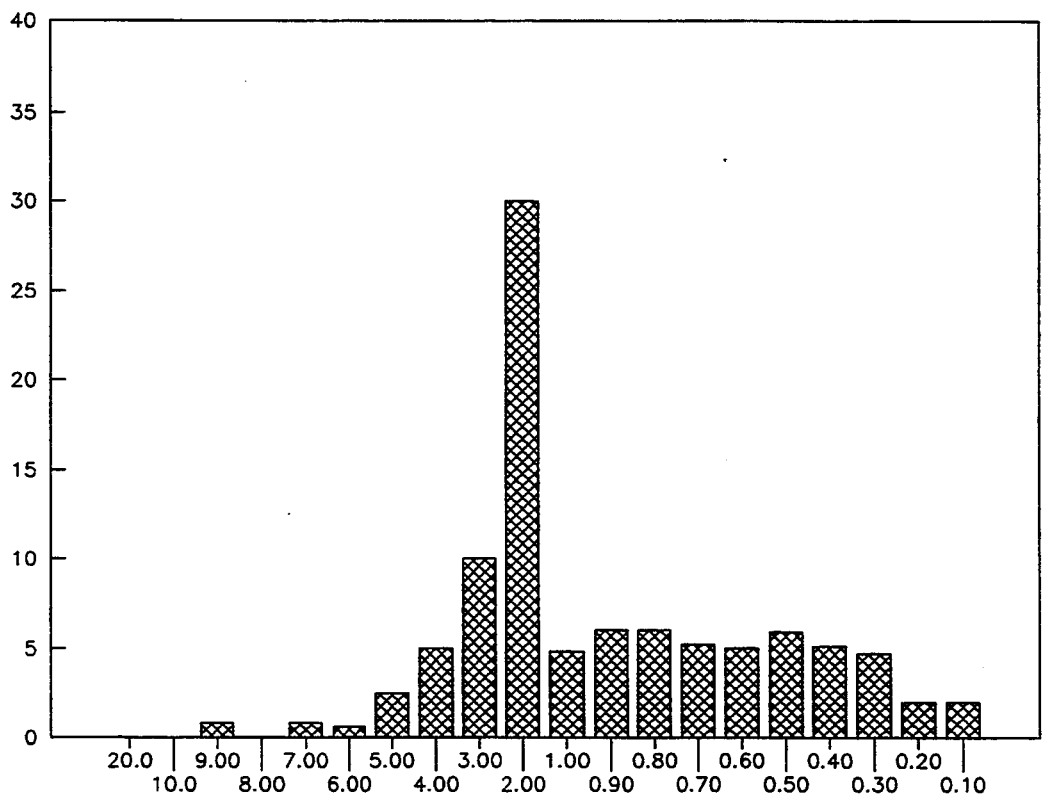
Figure 6:
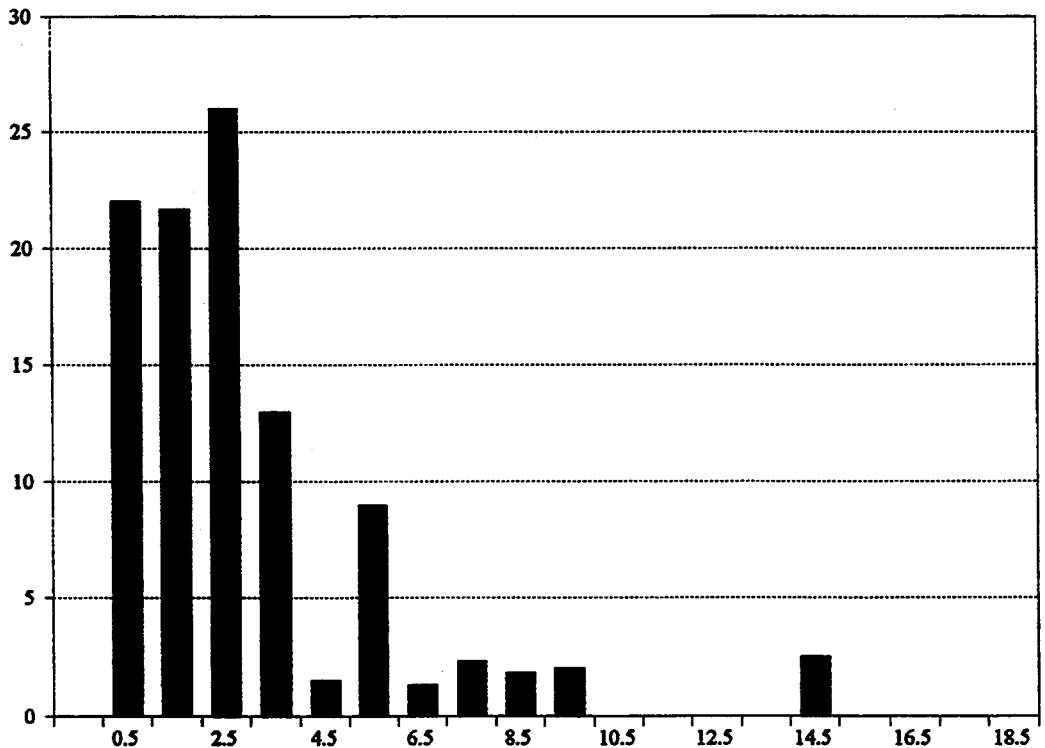
Figure 14:
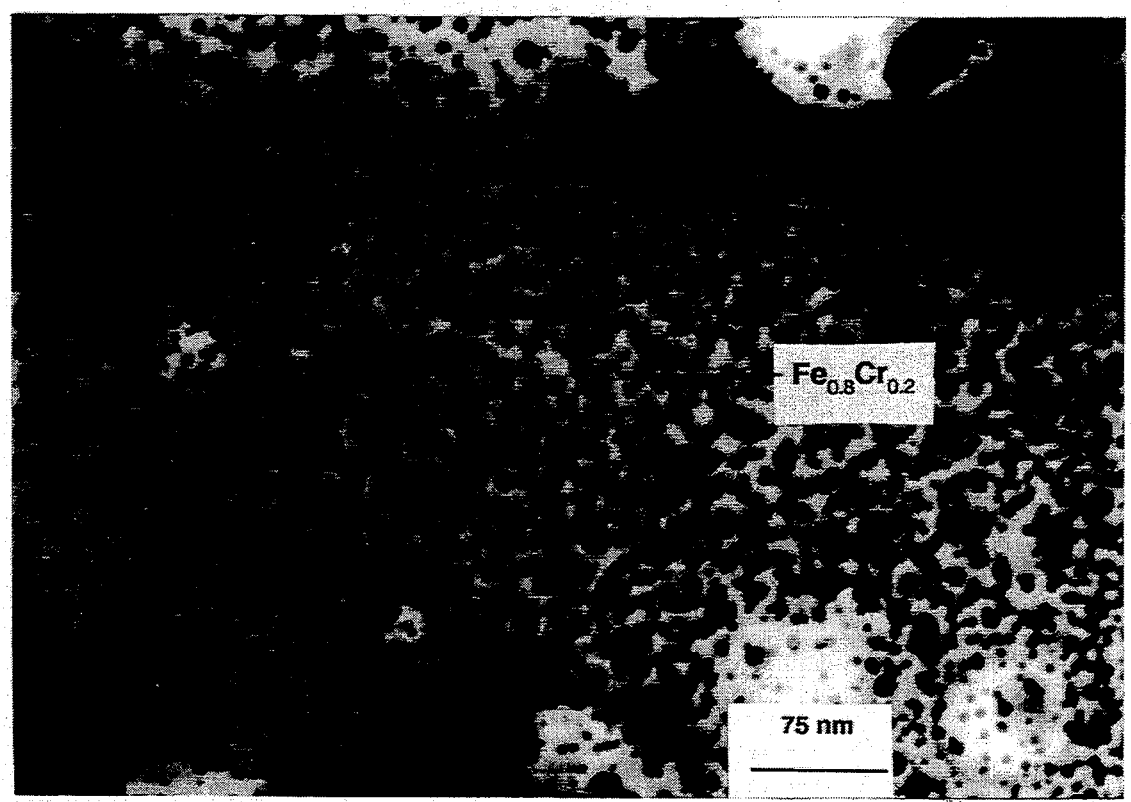

The solution E is agitated for 40 mn in order that the following complexing reaction is complete:

$0.9\ Al(NO_3)_3 + 0.8\ Fe(NO_3)_3 + 0.02\ Cr(NO_3)_3 + 3\ NH_4)_2C_2O_4 \rightarrow (NH_4)_3Al_{0.9}Fe_{0.08}Cr_{0.02}(C_2O_4)_3 + 3NH_4NO_3$ The molar concentration of oxalate is equal to 0.75 mole/l.

b) A solution F containing 750 cm³ of methanol and 750 cm³ of ethylene glycol is prepared with agitation. The solution E is added into the solution F with agitation. The mixed oxalate $(NH_4)_3Al_{0.9}Fe_{0.08}Cr_{0.02}(C_2O_4)$ precipitates after several minutes. The agitation is continued for 1 hour at ambient temperature (20° C.).

c-e) The conditions of filtration, drying, decomposition of the oxalic precursor, the thermal and reheating treatments are similar to those described in Example 1.

f) The mixed oxide $Al_{1.8}Cr_{0.04}Fe_{0.16}O_3$ thus synthesized is reduced for 10 hours under dry hydrogen at 1050° C. The same analyses as previously were carried out on the composite powder. The results are as follows:
specific surface area: 1.9 m²/g,
average size of grains of powder (FIG. 5): 1.3 μm,
average size of particles of the alloy $Fe_{0.8}Cr_{0.2}$: 4.0 nm (graph of FIG. 6 and micrograph of FIG. 14.)

Example 6

Preparation of a cermet from the powder obtained in Example 5.

Figure 15:
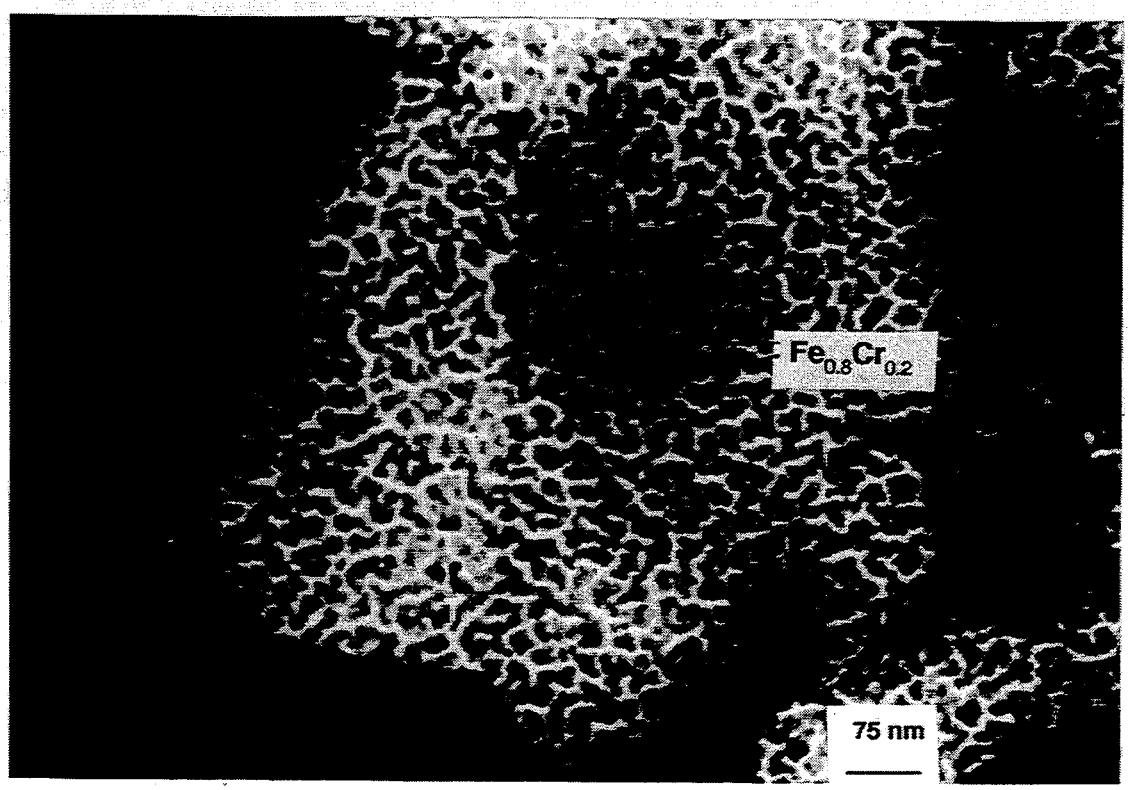

The composite powder is densified under the conditions described in Example 1. The microstructure of the cermet thus obtained is shown in the micrograph of FIG. 15. The microstructural characteristics and mechanical properties of the cermet are summarized in the summary table at the end of the description.

Example 7

Preparation of an alumina-molybdenum powder containing 10.8% by weight of molybdenum.

a) A solution G is prepared starting with:
50.64 g of aluminum nitrate ($Al(NO_3)_3.9H_2O$),
2.40 g of molybdic acid (($NH_4)_2Mo_4O_{13}$),
63.95 g of ammonium oxalate (($NH_4)_2C_2O_4.H_2O$),
150 cm³ of distilled water.

Figure 7:
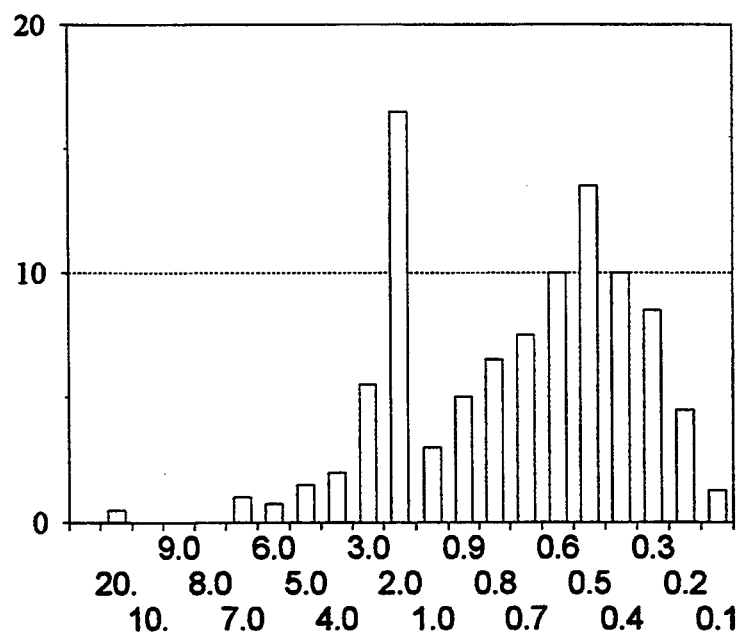
Figure 16:
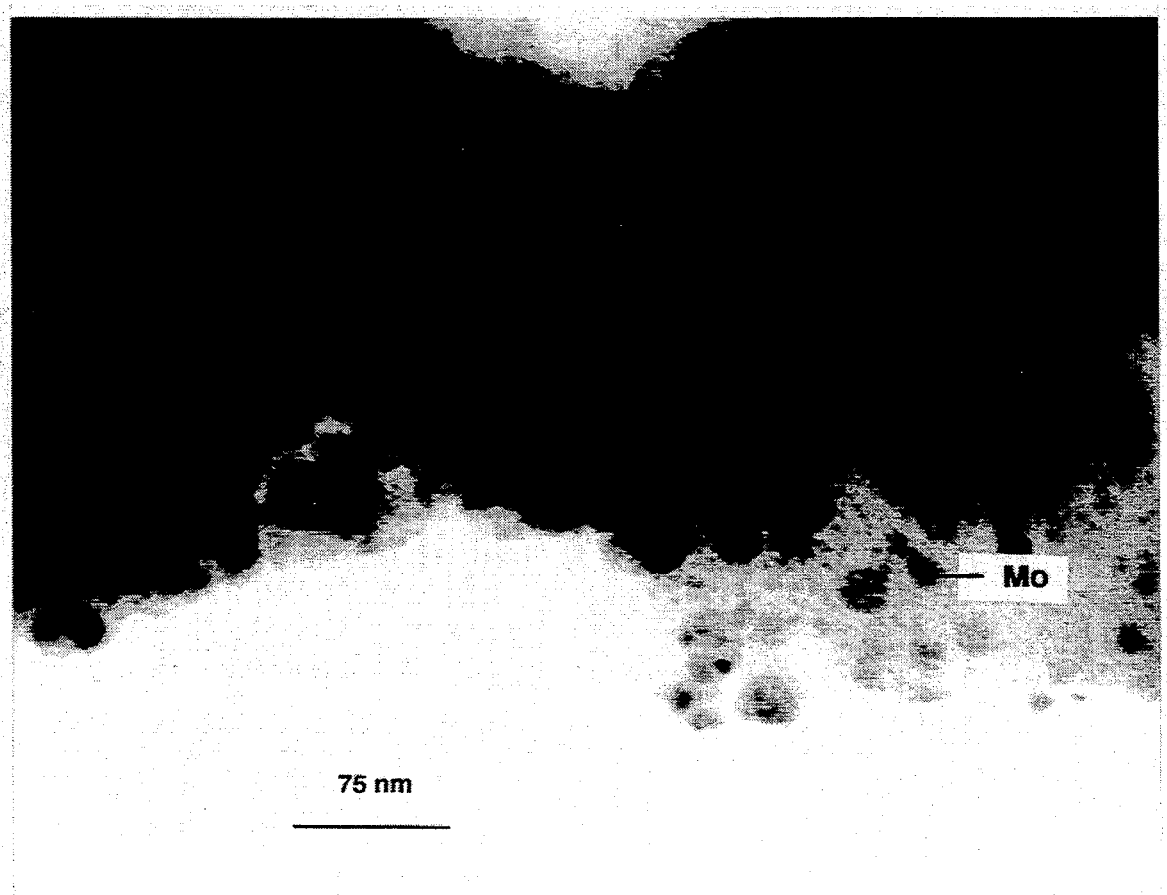

The precursor $(NH_4)_{3.14}Al_{0.9}(MoO_3)_{0.1}(C_2O_4)_3$ is obtained.

b) A solution B (identical to that prepared in Example 1) containing 750 cm³ of ethanol and 750 cm³ ethyleneglycol is prepared with agitation. The solution G is added into the solution B with agitation. The mixed oxalate $(NH_4)_{3.15}Al_{0.9}(MoO_3)_{0.1}(C_2O_4)_3$ precipitates after several minutes. The agitation is maintained for 1 hour at ambient temperature (20° C.).

c-d) The conditions of filtration, drying, decomposition of the oxalic precursor are similar to those described in Example 1.

f) The mixed amorphous oxide thus obtained is directly treated under dry hydrogen, without annealing because of the high melting point of the molybdenum (1610° C.). The reduction process is carried out in the following manner: speed of heating 5° C./mn, 450° C. plateau for 2 hours, 1150° C. plateau for 5 hours. The same analyses as before are carried out on the composite powder. The results are as follows:
specific surface area: 2 m²/g,
average size of grains of powder (FIG. 7): 1.3 μm,
average size of molybdenum particles: 40 nm (micrograph of FIG. 16).

Example 8 Preparation of aluminum-chromium powder containing 21% by weight of chromium.

a) A solution H is prepared starting with:
45.02 g of aluminum nitrate ($Al(NO_3)_3.9H_2O$),
12.0 g of chromium nitrate ($Cr(NO_3)_3.9H_2O$),
63.95 g of ammonium oxalate (($NH_4)_2C_2O_4.H_2O$), 150 cm³ of distilled water.

The solution H is agitated for 40 minutes in order that the following complexing reaction is completed:

$$0.8\ Al(NO_3)_3 + 0.2\ Cr(NO_3)_3 + 3(NH_4)_2C_2O_4 \rightarrow (NH_4)_3Al_{0.8}Cr_{0.2}(C_2O_4)_3 + 3NH_4NO_3$$

Figure 8:
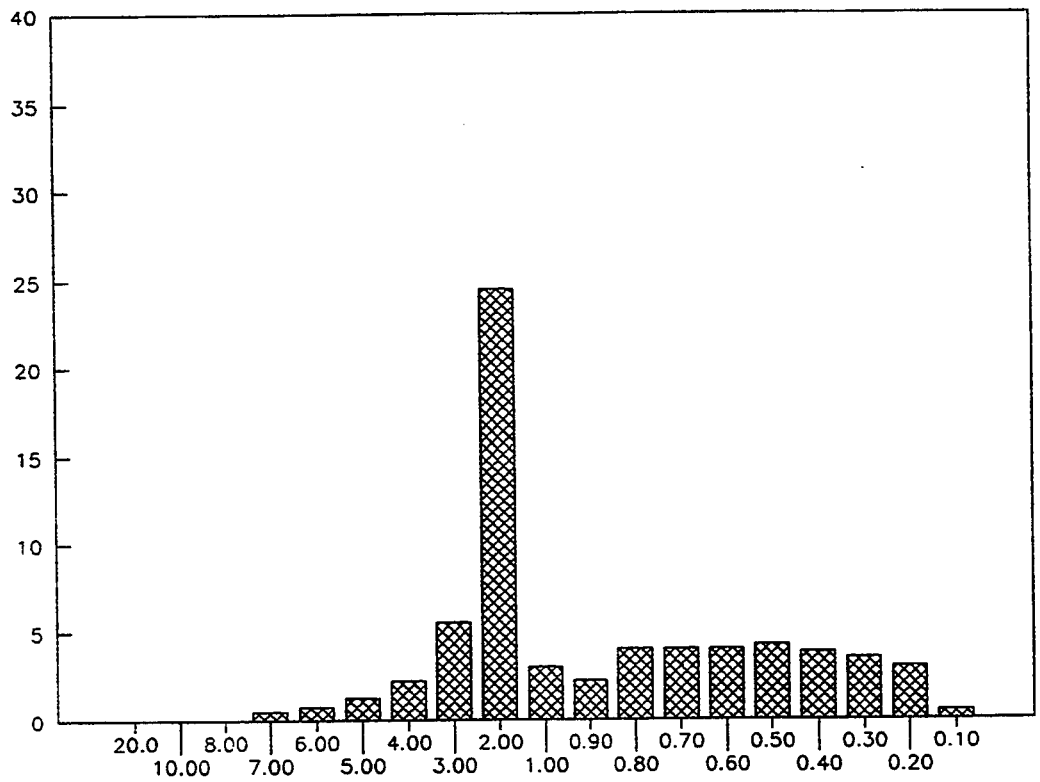
Figure 9:
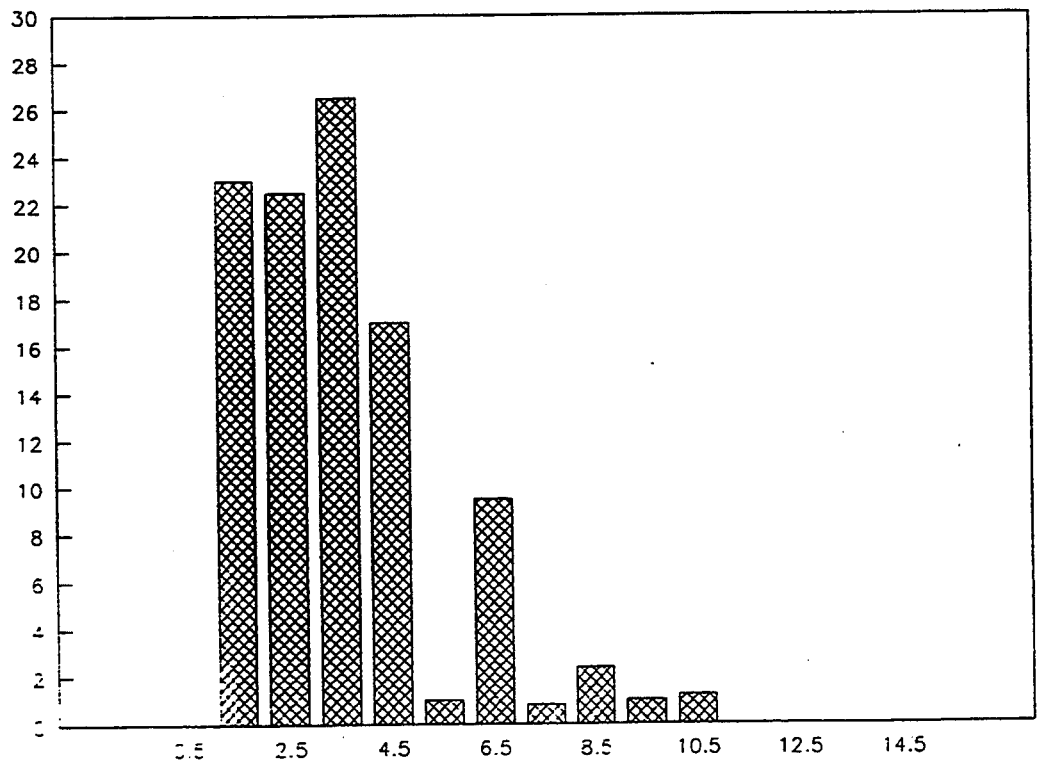
Figure 17:
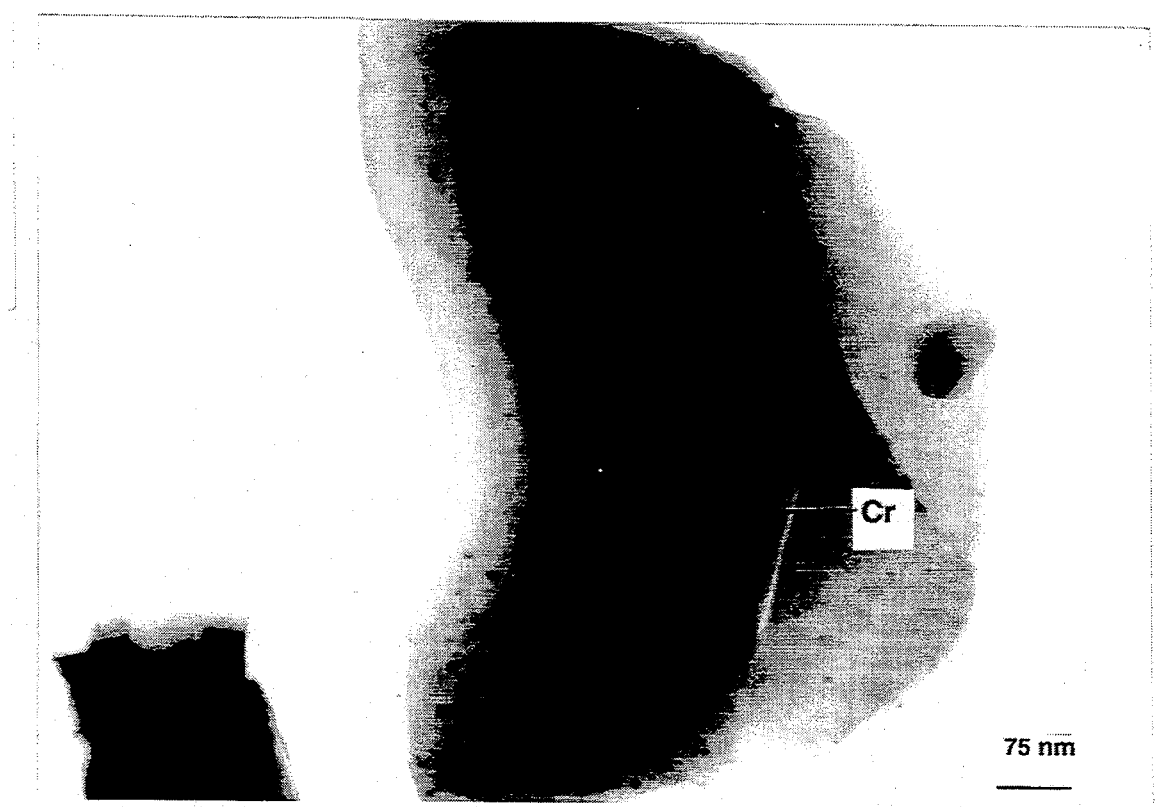

The molar concentration of oxalate is 0.75 mole/l.

b) A solution B (identical to the one of Example 1) containing 750 cm³ of ethanol and 750 cm³ of ethylene glycol is prepared with agitation. The solution H is added into the solution B with agitation. The mixed oxalate $(NH_4)_3Al_{0.8}Cr_{0.2}(C_2O_4)_3$ precipitates after several minutes. The agitation is continued for 1 hour at ambient temperature (20° C.).

c-d) The conditions of filtration, drying, decomposition of the oxalic precursor are similar to those described in Example 1.

f) The mixed amorphous oxide $Al_{1.6}Cr_{0.4}O_3$ thus synthesized is directly reduced over 20 hours under hydrogen at 1050° C. (melting temperature of chromium: 1875° C.). The same analyses as before are carried out on the composite powder. The results are as follows:
specific surface area: 1.9 m²/g
average size of grains of powder (FIG. 8): 1.3 μm,
average size of particles of chromium: 4.0 nm (diagram of FIG. 9 and micrograph of FIG. 17).

Example 9

Preparation of a cermet starting with the powder obtained in Example 8.

Figure 18:
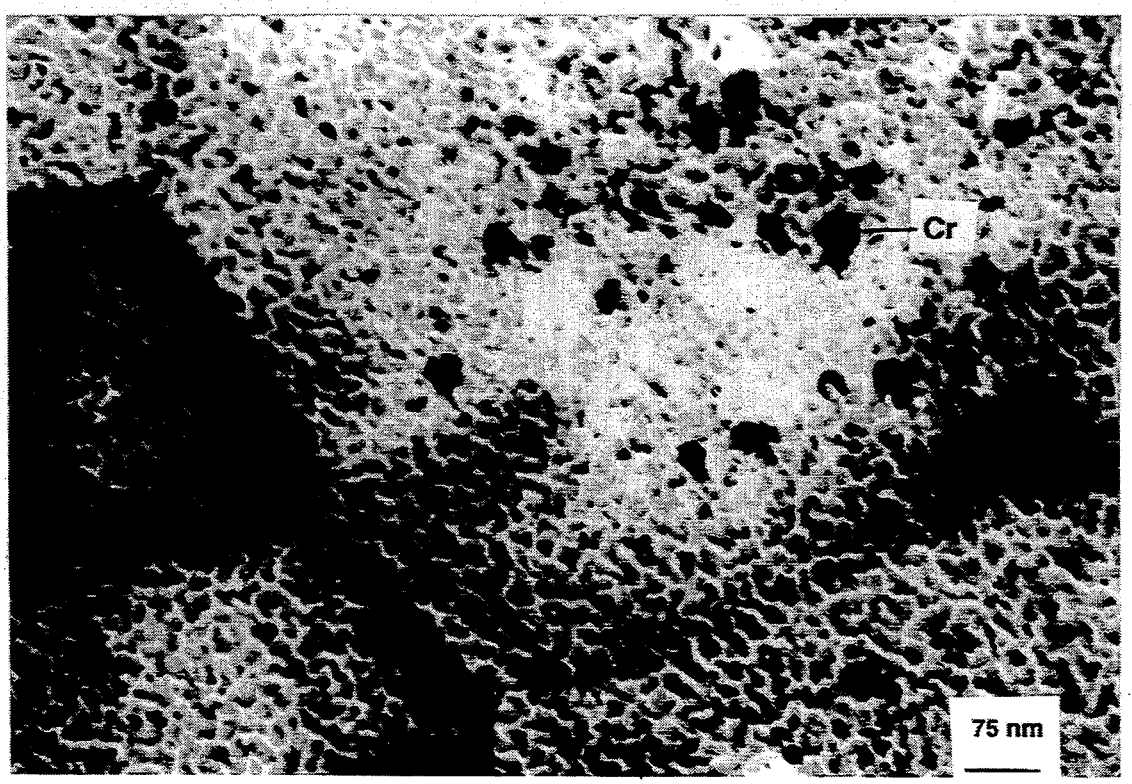

The composite powder is densified under the conditions described in Example 1. The degree of densification is 99%. The microstructure of the cermet thus obtained is shown in the micrograph of FIG. 18. The microstructural characteristics and mechanical properties of the cermet are compiled in the summary table which follows:

This table summarizes the structural and mechanical properties of the cermets obtained in Examples 2, 4, 6 and 9 described above:

SUMMARY TABLE

| Example | C (%) | d (nm) | $\sigma_f$ (MPa) | $K_{ic}$ (MPa/√m) | N |
|---------|-------|--------|------------------|-------------------|----|
| 2 | 5.4 | 20 | 600 | 7.2 | 50 |
| 4 | 10.8 | 30 | 530 | 6.8 | 30 |
| 6 | 10.8 | 20 | 650 | 7.5 | 27 |
| 9 | 21.0 | 25 | 600 | 6.5 | 30 |

C: weight percent of metallic phase
d: average diameter of metallic particles (RX, Scherrer method)
$\sigma_f$: resistance to rupture in three point flexure
$K_{ic}$: Factor of the intensity of the critical constraint ("S.E.N.B." method), toughness
N: number of thermal shocks to rupture by plunging into water ($\Delta_T = 600°$ C.)

By way of comparison, given hereafter are the characteristics of a ceramic of alumina $\alpha Al_2O_3$ sintered under the same conditions (degree of densification 99%):
$\sigma_f$ = 450 MPa
$K_{ic}$ = 4 MPa/√m
N = 3 cycles

Example 10

Preparation of a composite alumina-iron/chromium alloy powder containing 21% by weight of the alloy
a) A solution is prepared starting from:
45.02 g of aluminum nitrate (Al(NO₃)₃.9H₂O),
6.06 g of ferric nitrate (Fe(NO₃)₃.9H₂O),
6.00 g of chromium nitrate (Cr(NO₃)₃.9H₂O),
63.95 g of ammonium oxalate ((NH₄)₂C₂O₄.H₂O),
150 cm³ of distilled water.

The solution is agitated for 1 hour in order that the following complexing reaction is complete:

$$0.8\ Al(NO_3)_3 + 0.1\ Fe(NO_3)_3 + 0.1\ Cr(NO_3)_3 + 3(NH_4)_2C_2O_4 \rightarrow (NH_4)_3Al_{0.8}Fe_{0.1}Cr_{0.1}(C_2O_4)_3 + 3NH_4NO_3$$

The molar concentration of oxalate is equal to 0.75 mole/l.

b-e) The conditions of precipitation, filtration, drying, decomposition of the oxalic precursor, thermal annealing treatment are similar to those described in Example 1.

f) The mixed oxide $Al_{1.6}Cr_{0.2}Fe_{0.2}O_3$ thus synthesized is reduced for 20 hours under dry hydrogen at 1050° C.

The same analyses as before were carried out on the composite powder. The results are as follows:
specific surface area: 3.1 m²/g,
average size of the grains of powder: 2.2 μm,
average size of particles of the alloy $Fe_{0.5}Cr_{0.5}$: 4.2 nm.

We claim:

1. A process for the production of a composite powder of ceramic/metal comprising:
   (a) preparing an aqueous solution of a mixed carboxylic salt of aluminum and one or more transition metals, having the formula $Al_{1-x}M_x(R)_n$ where M represents the transition metal or metals, R is a carboxylic radical, x is less than 0.3 and n is a whole number,
   (b) precipitating the mixed salt by an organic solvent miscible with water, in which said salt is stable and insoluble,
   (c) separating the precipitate obtained from the liquid phase and recovering the precipitate in the form of a micronic powder of mixed salt precursor,
   (d) subjecting said precursor to a thermal decomposition treatment in the presence of oxygen at a temperature of between 300° C. and 500° C. for decomposing the precursor and producing a mixed amorphous oxide of aluminum and the transition metal or metals $(Al_2O_3)_{1-x}M_{2x}O_y$, where y is a whole number which is a function of the valence of the transition metal or metals,
   (e) in the case of metals or alloys having a melting point less than 1600° C., subjecting the mixed oxide to an annealing heat treatment in the presence of oxygen at a temperature of between 1000° C. and 1300° C. for obtaining a solid crystallized solution of aluminum and oxides of the transition metal or metals,
   (f) reducing either the mixed amorphous oxide from step (d), or in the case of metals or alloys having a low melting point, the solid crystalline solution from step (e), by a heat treatment under a reducing atmosphere free of water vapor at a temperature of between 1000° C. and 1300° C. for a period of more than 2 hours.

2. A process for production as in claim 1 including preparing the aqueous solution of the mixed carboxylic salt from at least one salt of a metal selected from the group consisting of iron, chromium, molybdenum, cobalt, nickel, niobium or with at least two salts of these metals able to form an alloy.

3. A process as in claim 1, and including preparing the solution by mixing in an aqueous medium the oxalic acid or a salt of oxalic acid, a salt of aluminum and at least one salt of a transition metal in order for producing the mixed carboxylic salt by a complexing reaction between the oxalic radicals, the ions of metallic aluminum and the ions of the transition metal or metals.

4. A process as in claim 3, and including choosing the aluminum oxalate, chloride or nitrate of aluminum and the chloride or nitrate of the transition metal or metals, for forming the following mixed carboxylic salt:

$$Al_{(1-x)} M_x (C_2 O_4)_3 (NH_4)_3.$$

5. A process as in claim 1, and wherein said aqueous solution of mixed carboxylic salt has a concentration of between 0.1 and 3 moles/l.

6. A process as in claim 1, and including causing the mixed carboxylic salt to precipitate while adding the aqueous solution into an alcoholic solvent or a mixture of an alcoholic solvent and another organic solvent, or a mixture of ethanol/ethyleneglycol or methanol/ethyleneglycol.

7. A process as in claim 6 for the production of a composite powder of alumina/iron, comprising using as the solvent in step b ethanol with the addition of a minor amount of a base.

8. A process as in claim 5, and wherein step (b) comprises pouring the aqueous solution of mixed carboxylic salt into the solvent in such a manner that the volumetric ratio between said aqueous solution and said solvent comprises between 5 and 20, the medium being agitated for a period of at least 30 minutes at a temperature at most equal to 30° C.

9. A production process as in claim 1, and wherein step (c) comprises separating the precipitate by filtration or centrifugation, washing the precipitate with acetone or ethanol, and drying the precipitate at a temperature less than 80° C.

10. A process for production as in claim 1, and wherein the decomposition treatment according to step (d) comprises slowly heating the powder under a sweeping of air, at a speed of temperature rise at most equal to 2° C. per minute, to a plateau temperature between 370° and 450° C., and maintaining the powder at this plateau temperature for at least one hour.

11. A process as in claim 1 for producing a composite powder containing a low melting point transition metal selected from the group consisting of iron, cobalt or nickel, or a low melting point alloy: iron/chromium, cobalt/nickel or nickel/chromium, and subjecting the mixed oxide obtained from step (d) to an annealing heat treatment in air for at least 30 minutes.

12. A production process as in claim 11, and wherein the reduction of the crystallized solid solution according to step (f) is carried out under an atmosphere of dry hydrogen for a period of between 2 and 20 hours.

13. A process as in claim 1 for the production of a composite powder containing a high melting point transition metal selected from chromium and niobium, and wherein the reduction of the mixed amorphous oxide from step (d) is directly carried out under an atmosphere of dry hydrogen for a period of between 10 and 20 hours.

14. A process as in claim 1 for the production of a composite alumina/molybdenum powder, and wherein the reduction of the mixed amorphous oxide from step (d) is directly carried out under an atmosphere of dry hydrogen while heating the oxide first to a plateau temperature of between 400 and 500° C. for a period comprising between 1 and 5 hours, then heating to a final plateau temperature comprising between 1000° and 1200° C. for a period comprising between 5 and 20 hours.

15. A production process for a cermet comprising preparing a composite powder of ceramic/metal by carrying out the process of claim 1 and sintering this powder under the following conditions:
- adding a minor amount of an organic binder having a decomposition temperature of between 150° C. and 300° C., said decomposition being accompanied by a release of CO,
- compacting the mixture of powder/binder,
- heating the compacted mixture, under a neutral atmosphere or under reduced pressure, at a temperature of between 1350° C. and 1550° C.

* * * * *